(12) United States Patent
Kakishima et al.

(10) Patent No.: US 10,256,886 B2
(45) Date of Patent: Apr. 9, 2019

(54) BASE STATION, USER EQUIPMENT, AND METHOD FOR DETERMINING PRECODING MATRIX

(71) Applicant: NTT DOCOMO, INC., Tokyo (JP)

(72) Inventors: Yuichi Kakishima, Tokyo (JP); Satoshi Nagata, Tokyo (JP); Chongning Na, Beijing (CN); Xiaolin Hou, Tokyo (JP); Huiling Jiang, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/564,873

(22) PCT Filed: Jun. 11, 2015

(86) PCT No.: PCT/US2015/035273
§ 371 (c)(1),
(2) Date: Oct. 6, 2017

(87) PCT Pub. No.: WO2016/164058
PCT Pub. Date: Oct. 13, 2016

(65) Prior Publication Data
US 2018/0091207 A1    Mar. 29, 2018

Related U.S. Application Data

(60) Provisional application No. 62/144,705, filed on Apr. 8, 2015.

(51) Int. Cl.
*H04B 7/06* (2006.01)
*H04B 7/0413* (2017.01)
*H04B 7/0456* (2017.01)
*H04L 25/03* (2006.01)

(52) U.S. Cl.
CPC ......... *H04B 7/0626* (2013.01); *H04B 7/0413* (2013.01); *H04B 7/0469* (2013.01); *H04B 7/0639* (2013.01); *H04L 25/03343* (2013.01); *H04B 7/0632* (2013.01); *H04L 25/03891* (2013.01)

(58) Field of Classification Search
CPC .. H04B 7/0626; H04B 7/0469; H04B 7/0639; H04B 7/0632; H04L 25/03343
USPC ............................................ 455/39, 69, 561
See application file for complete search history.

(56) References Cited

U.S. PATENT DOCUMENTS

2009/0052357 A1* 2/2009 Suo .................. H04L 5/006
370/280
2013/0039235 A1* 2/2013 Rahman ............ H04B 7/0417
370/280
(Continued)

FOREIGN PATENT DOCUMENTS

WO    2013/191503 A1    12/2013
WO    2014/190903 A1    12/2014

OTHER PUBLICATIONS

International Search Report issued in PCT/US2015/035273 dated Feb. 1, 2016 (2 pages).
(Continued)

*Primary Examiner* — Ayodeji O Ayotunde
(74) *Attorney, Agent, or Firm* — Osha Liang LLP

(57) ABSTRACT

A base station that communicates with a user equipment using multiple antenna ports includes an uplink channel estimation unit that estimates uplink channel states, a downlink channel estimation unit that estimates downlink channel states based on the estimated uplink channel states and channel reciprocity of uplink and downlink, a receiver unit that receives from the user equipment CSI feedback information, and a precoder generating unit that determines a precoding matrix of downlink based on Channel State Information (CSI) indicating the estimated downlink channel states and on the CSI feedback information.

17 Claims, 12 Drawing Sheets

(56) References Cited

U.S. PATENT DOCUMENTS

2013/0343299 A1* 12/2013 Sayana ................ H04B 7/0417
370/329
2014/0177744 A1* 6/2014 Krishnamurthy .... H04B 7/0469
375/267
2016/0329942 A1* 11/2016 Zhu ................... H04L 25/03898

OTHER PUBLICATIONS

Wfritten Opinion of the International Searching Authority issued in PCT/US2015/035273 dated Feb. 1, 2016 (7 pages).
3GPP TS 36.212 V12.4.0; "3rd Generation Partnership Project; Technical Specification Group Radio Access Network; Evolved Universal Terrestrial Radio Access (E-UTRA); Multiplexing and channel coding (Release 12)"; Mar. 2015 (94 pages).
3GPP TS 36.213 V12.5.0; "3rd Generation Partnership Project; Technical Specification Group Radio Access Network; Evolved Universal Terrestrial Radio Access (E-UTRA); Physical layer procedures (Release 12)"; Mar. 2015 (239 pages).
3GPP TS 36.211 V125.0; "3rd Generation Partnership Project; Technical Specification Group Radio Access Network; Evolved Universal Terrestrial Radio Access (E-UTRA); Physical channels and modulation (Release 12);" Mar. 2015 (136 pages).
Notification of Reasons for Refusal issued in Japanese Application No. 2017-552886, dated Jan. 8, 2019 (6 pages).
3GPP TSG RAN WG1 #79; R1-145087; "Elevation Beamforming and FD-MIMO with 2D Antenna Array;" Qualcomm Incorporated; Nov. 17-21, 2014; San Francisco, USA (5 pages).

* cited by examiner

PRIOR ART

PRIOR ART

BASE STATION, USER EQUIPMENT, AND METHOD FOR DETERMINING PRECODING MATRIX

TECHNICAL FIELD

The present invention relates generally to physical and link layer designs of wireless systems such as LTE (Long Term Evolution). The design uses complemental feedback of channel state information for multi-antenna transmission system exploiting channel reciprocity.

BACKGROUND ART

Advancements in MIMO (Multiple Input Multiple Output) technologies using multiple transmitter and receiver antennas are being studied under the LTE standard. For example, in typical downlink MIMO communication, a user equipment (UE) estimates downlink channel states based on downlink reference signals from the base station. The UE reports the estimated downlink channel states as channel state information (CST) feedback information to the base station. The base station then performs link adaptation for downlink data transmission based on the CSI feedback information. Typical link adaptation may include control of the number of spatial multiplexing layers, transmission beam control, and a modulation and coding scheme. A codebook-based precoding scheme and a beam selection-based precoding scheme are described below as examples of closed-loop precoding schemes in the link adaptation using precoding.

FIG. 1 shows a sequence diagram of signal processing of the codebook-based precoding scheme. In the codebook-based precoding, the base station transmits the reference signal for estimating the downlink channel states, (for example, a Channel State Information Reference Signal (CSI-RS)) (step S11). Based on an estimation result of the received reference signal, the UE selects the best weights among predetermined precoding weights candidates (codebook) and provides the best weights as an index (PMI: Precoding Matrix Indicator) to the base station for feedback of the CSI (step S12). In the downlink transmission, the base station transmits a data signal precoded based on the PMI (step S13).

FIG. 2 shows a sequence diagram of an example of signal processing of the beam selection-based precoding scheme. In the beam selection-based scheme, the base station transmits multiple precoded beams (for example, a precoded CSI-RS) (step S21). The UE selects the suitable beam(s) among the precoded beams and provides a result of selection indicating a Beam Index (BI) to the base station for feedback (step S22). The base station transmits the downlink data signal precoded based on the result of selection (step S23).

On the other hand, 3D (three-dimensional) MIMO techniques are being studied under the LTE standard Release 13. The 3D MIMO techniques are capable of transmission beam control in a three-dimensional direction using a 3D MIMO antenna, wherein antenna elements are arranged in vertical and horizontal two-dimensional plane or even three-dimensional space.

The closed-loop precoding schemes as described above requires, as the number of antennas such as the 3D MIMO antenna increases, uplink channels used for the CSI feedback and more resources for the channels used for the CSI feedback. Reciprocity-based link adaptation is being studied for resource reservation for the channels used for the CSI feedback. For example, with reciprocity-based precoding, instead of measuring the downlink channel states as described above, the base station measures uplink channel states and controls downlink beamforming based on the measured uplink channel states. The reciprocity-based precoding is based on an assumption called channel reciprocity that uplink channel states and downlink channel states are approximately equivalent, and the measurement result of the uplink channel states is used instead of the downlink channel states. It is possible to measure the uplink channel states based on an uplink reference signal such as a SRS (Sounding Reference Signal) or a DM-RS (Demodulation Reference Signal) transmitted by the user equipment.

It is possible to consider that CSI is obtained based on both of channel reciprocity and CSI feedback. For example, for beamformed CSI-RS based scheme, CSI-RS can be beamformed based on CSI obtained from channel reciprocity.

To sufficiently assure channel reciprocity as described above, the level of imperfections of transmitter and receiver antenna and RF equipment must be low (accuracy of calibration must be sufficient). If accuracy of calibration is low, accuracy of channel information obtained based on channel reciprocity is lowered, and as a result, a part or all of the channel information may be unusable. Furthermore, if the number of downlink receiver antennas is different from the number of uplink transmitter antennas, the channel state information based on channel reciprocity is obtained only from a partial combination of antennas.

As described above, in system assuring channel reciprocity, uplink channel estimation results can be utilized in link adaptation for downlink transmission. However, link adaptation depending solely on channel reciprocity may not be possible due to RF imperfections and reception quality of reference signals.

Furthermore, link adaptation depending on channel reciprocity only may have limitations in some situations even if RF imperfections do not cause problems and reception quality is sufficiently high. For example, a system performing channel reciprocity-based precoding allows the base station to select a transmission precoding vector or a precoding matrix indicator (PMI) based on the estimated uplink channel state. However, it may be difficult to control the number of multiple layers and the encoded modulation system because the base station cannot estimate channel quality and interference conditions in the user equipment. In addition, as described above, if the number of antennas of uplink and the number of antennas of downlink are asymmetrical, channel state information obtained by channel reciprocity is limited.

Therefore, in a system adopting characteristics of channel reciprocity, accuracy of link adaptation may be lowered due to imperfections and reception quality of reference signals of an RF circuit and an antenna system. In addition, in a case where channel reciprocity is used, it may be difficult to perform adaptive control of the number of multiple layers and the encoded modulation system because the base station cannot estimate received power and interference conditions in the user equipment.

CITATION LIST

Non-Patent Reference

[Non-Patent Reference 1] 3GPP, TS 36.211, V12.5.0
[Non-Patent Reference 1] 3GPP, TS 36.212, V12.4.0
[Non-Patent Reference 1] 3GPP, TS 36.213, V12.5.0

SUMMARY OF THE INVENTION

According to one aspect of the present invention, a base station that communicates with a user equipment using multiple antenna ports may comprise: an uplink channel estimation unit that estimates uplink channel states; a downlink channel estimation unit that estimates downlink channel states based on the estimated uplink channel states and channel reciprocity of uplink and downlink; a receiver unit that receives from the user equipment CSI feedback information; and a precoder generating unit that determines a precoding matrix of downlink based on Channel State Information (CSI) indicating the estimated downlink channel states and on the CSI feedback information. For example, according to one or more embodiments of the present invention, a base station in a multi-antenna system obtains channel state information using channel reciprocity to achieve link adaptation with high accuracy.

According to another aspect of the present invention, a user equipment that communicates with a base station may comprise: a channel estimation unit that estimates downlink channel states based on reference signals for estimating downlink channel states transmitted from multiple antenna ports of the base station; a CSI feedback information generating unit that generates CSI feedback information based on the estimated downlink channel states; and a transceiver unit that transmits to the base station the CSI feedback information and reference signals for estimating uplink channel states. In one or more embodiments, a precoding matrix of downlink is determined, by the base station, based on the CSI feedback information and CSI indicating downlink channel states estimated using the reference signals and channel reciprocity of uplink and downlink.

According to another aspect of the present invention, a method for determining a precoding matrix in three-dimensional (3D) Multiple Input Multiple Output (MIMO) system may comprise: estimating, with a base station, uplink channel states; estimating, with the base station, downlink channel states based on the estimated uplink channel states and channel reciprocity of uplink and downlink; transmitting, with a user equipment, CSI feedback information to the base station; and determining, with the base station, precoding matrix of downlink based on CSI indicating the estimated downlink channel states and the CSI feedback information from the user equipment.

According to another aspect of the present invention, a wireless communication system may comprise the base station and user equipment as described above. The base station, the user equipment, and the method for determining the precoding matrix according to one or more embodiments of the present invention enable highly accurate channel state estimation and effective precoding processing in 3D MIMO.

DETAILED DESCRIPTION OF EMBODIMENTS

Embodiments of the present invention will be described below with reference to the drawings.

(System Configuration)

Figure 1:
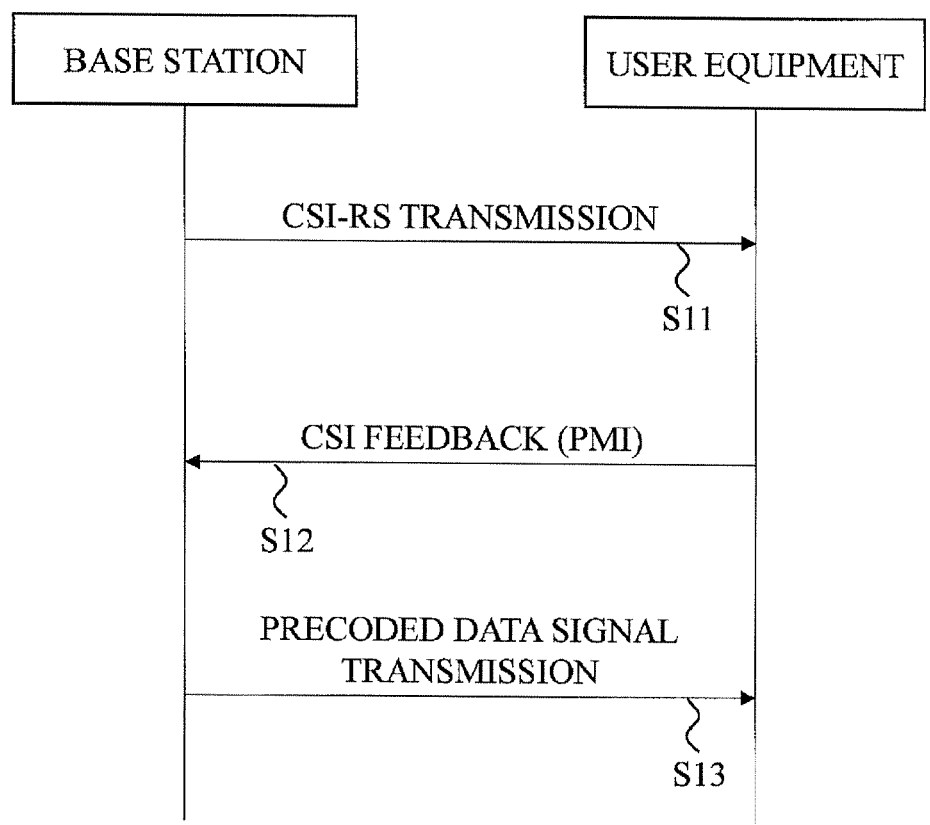
FIG. 1 is a sequence diagram of an example of signal processing of a codebook-based precoding.
Figure 2:
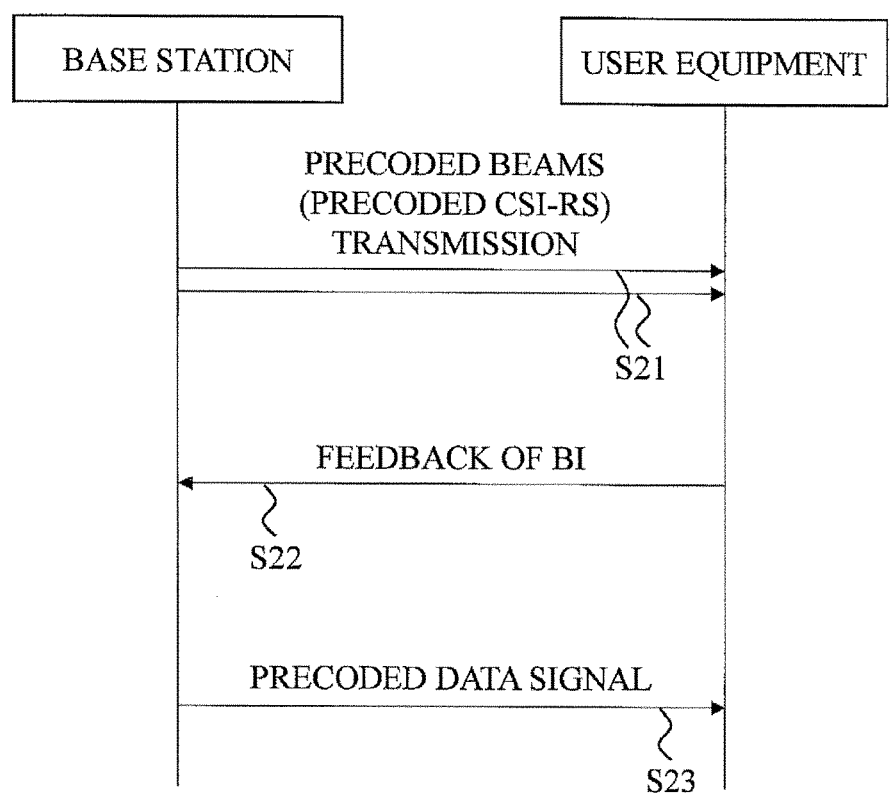
FIG. 2 is a sequence diagram of an example of signal processing of a beam selection-based precoding.
Figure 3:
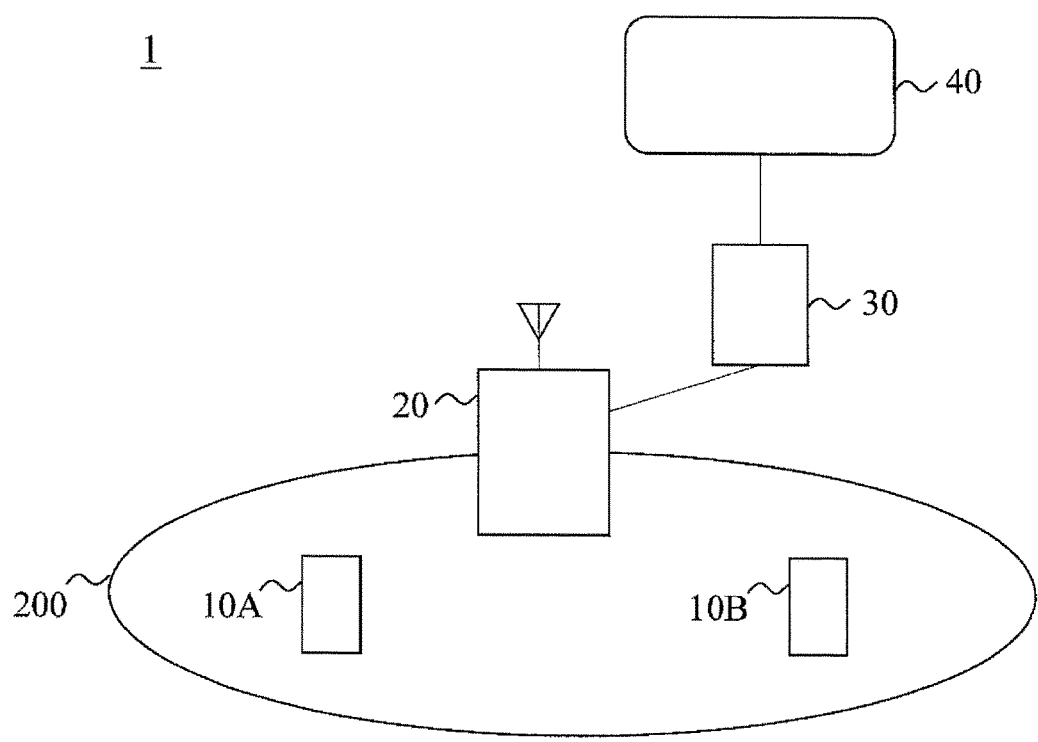
FIG. 3 is a diagram showing a configuration of a wireless communication system according to one or more embodiments of the present invention.

A wireless communication system 1 according to one or more embodiments of the present invention will be described below with reference to FIG. 3. FIG. 3 is a diagram showing a configuration of the wireless communication system 1 according to one or more embodiments of the present invention.

As shown in FIG. 3, the wireless communication system 1 comprises a user equipment (UE) 10 (UE 10A and UE 10B), a base station 20 including a cell 200, an access gateway apparatus 30, and core network 40. The wireless communication system 1 is a 3D MIMO system and may be an LTE system or an LTE-Advanced (LTE-A) system. However, the wireless communication system 1 is not limited thereto and may be any one of a wireless communication system supporting 3D MIMO communication. 3D MIMO may be classified as Elevation beamforming (BF) and Full dimension (FD)-MIMO according to the number of antenna ports. Specifically, 3D MIMO using eight or less antenna ports is Elevation beamforming and 3D MIMO using more than eight antenna ports is FD-MIMO and Massive MIMO.

The base station 20 communicates with the UE 10 via multiple antenna ports using 3D MIMO technology. The base station 20 may be Evolved NodeB (eNB). The base station 20 performs radio communication with the UE 10 via multiple antenna ports in a multi-dimensional antenna of the base station 20, such as a two-dimensional planar antenna or a three-dimensional antenna. The base station 20 receives downlink packets from a network equipment such as upper nodes or servers connected on a core network 40 via the access gateway apparatus 30, and transmits the downlink packets to the UE 10 via the multiple antenna ports. The base station 20 receives uplink packets from the UE 10 and transmits the uplink packets to the network equipment via the multiple antenna ports.

The base station 20 includes an antenna for 3D MIMO to transmit radio signals to the UE 10, a communication interface to communicate with an adjacent base station 20 (for example, X2 interface), a communication interface to communicate with the core network (for example, S1 interface), a CPU (Central Processing Unit) such as a processor or hardware resources such as a circuit to process transmitted and received signals with the UE 10. Functions and processing of the base station 20 described below may be implemented by the processor processing or executing data and programs stored in memory. However, the base station 20 is not limited to the hardware configuration set forth above and may include any appropriate hardware configurations. Generally, a plurality of the base stations 20 is disposed so as to cover a service area of the wireless communication system 1.

The UE 10 communicates with the base station 20 using 3D MIMO technology. The UE 10 transmits and receives radio signals such as data signals and control signals between the base station 20 and the UE 10 via one or more antenna ports of the UE 10. The UE 10 may be a mobile station, a smartphone, a cellular phone, a tablet, a mobile router, or information processing apparatus having a radio communication function such as a wearable device.

The UE 10 includes a CPU such as a processor, a RAM (Random Access Memory), a flash memory, and a radio communication device that transmits and receives radio signals between the base station 20 and the UE 10. For example, functions and processing of the UE 10 described below may be implemented by the CPU processing or executing data and programs stored in a memory. However, the UE 10 is not limited to the hardware configuration set forth above and may be configured with various circuits to achieve the processing described below.

(Overview)

Figure 4:
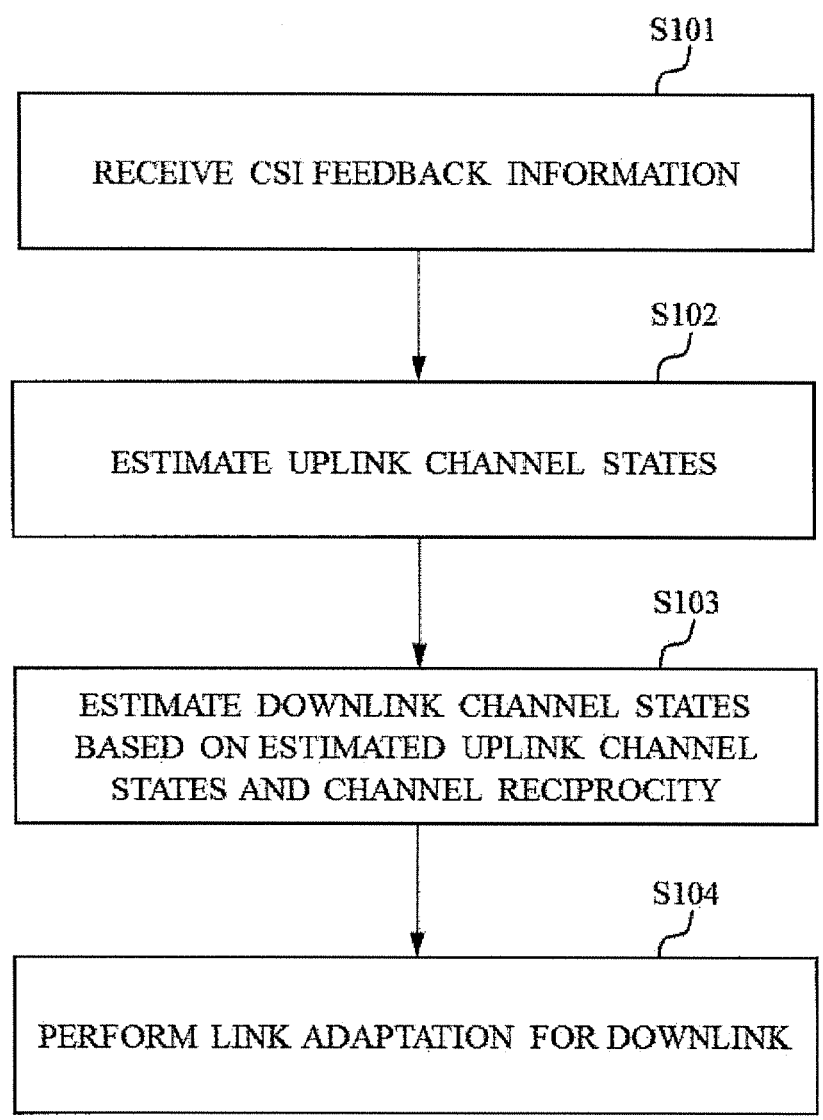
FIG. 4 is a flowchart showing a general overview of one or more embodiments of the present invention.

FIG. 4 is a flowchart showing a general overview of one or more embodiments of the present invention. According to one or more embodiments of the present invention, the base station 20 receives CSI (channel state information) feedback information from the UE 10 (step S101). The base station 20 estimates uplink channel states (step S102), and then estimates downlink channel states based on the estimated uplink channel states and channel reciprocity of uplink and downlink (step S103). The base station 20 performs link adaptation for downlink using CSI indicating the estimated downlink channel states and the received CSI feedback information (S104). The base station 20 can perform the link adaptation having high quality by using both the CSI feedback information and the CSI based on the channel reciprocity.

Generally, channel reciprocity is adopted in a Time Division Duplex (TDD) system. The reason is that the TDD system uses the same frequency bands between uplink and downlink. However, multipath channel characteristics that do not largely depend on frequency can partially assume channel reciprocity. For example, a radiation direction and an incoming direction of multi-path become similar between different frequencies of uplink and downlink. Therefore, Frequency Division Duplex (FDD) system may employ precoding transmission utilizing the channel reciprocity.

(Configuration of Base Station)

Figure 5:
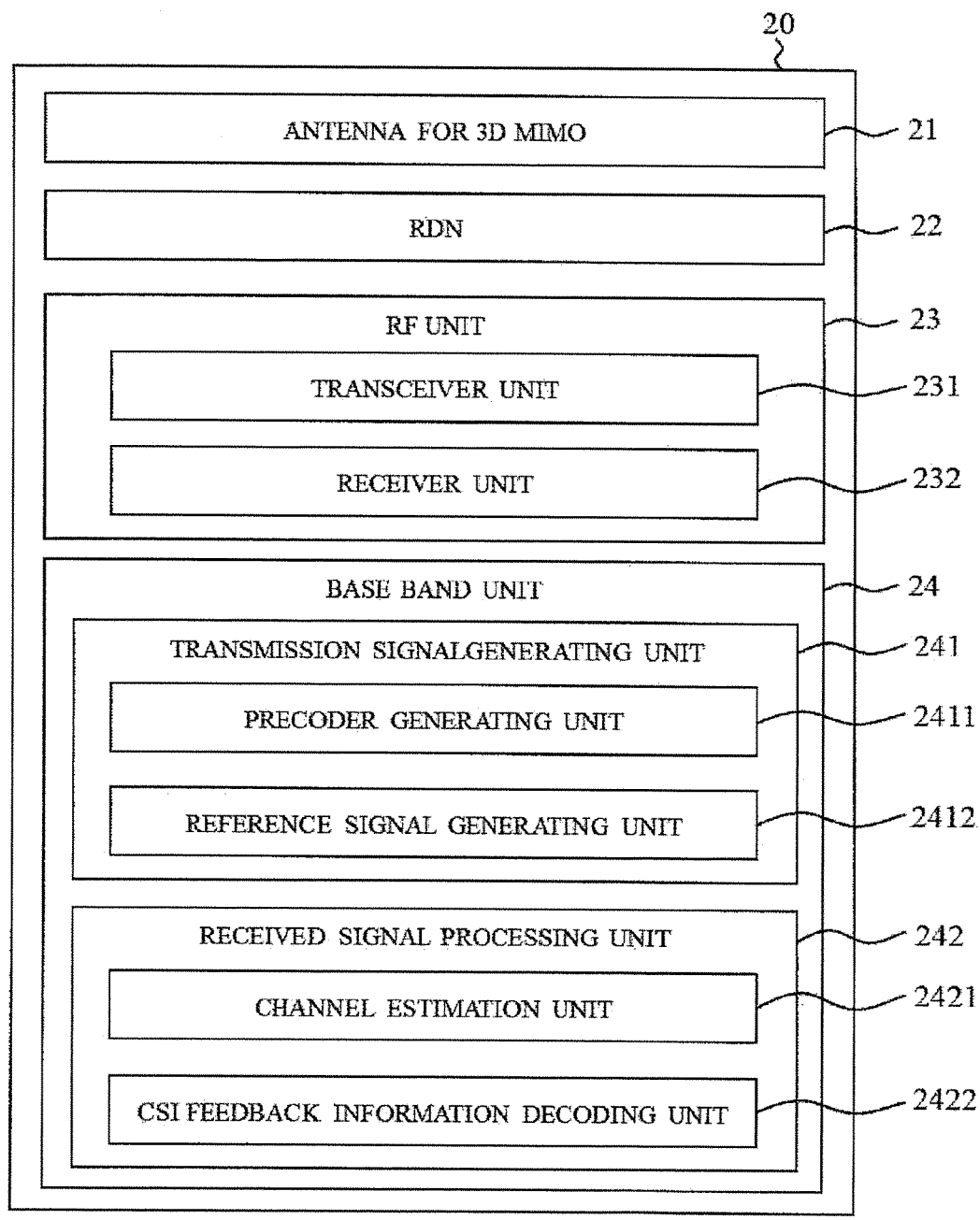
FIG. 5 is a functional block diagram of a base station according to one or more embodiments of the present invention.
Figure 6:
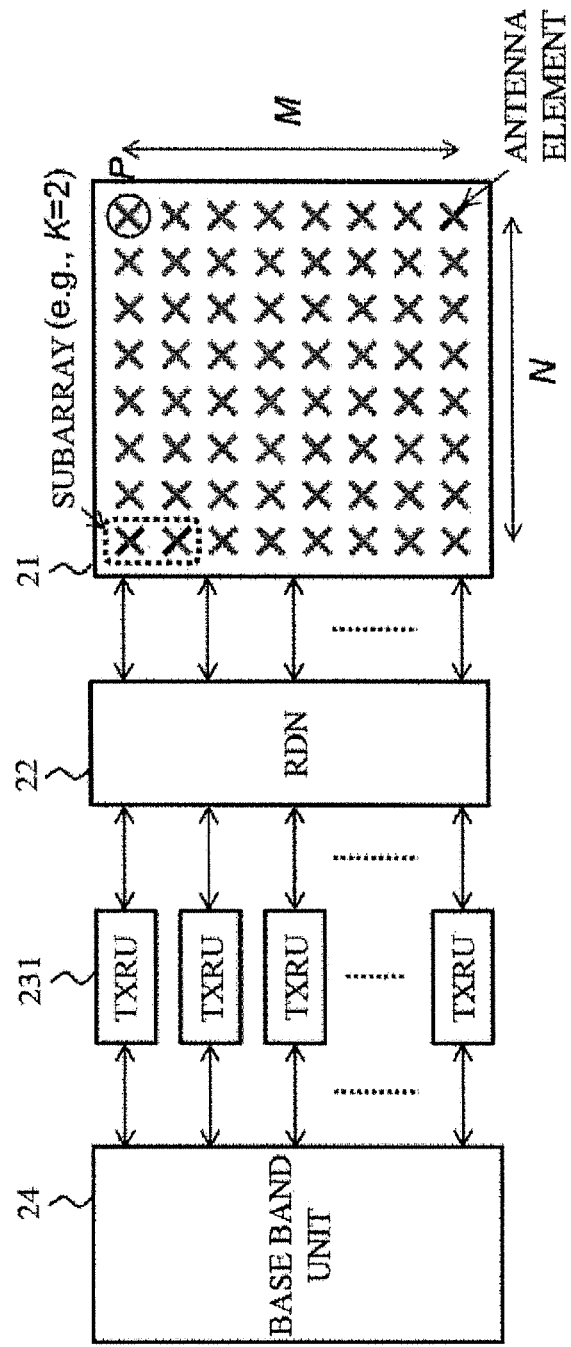
FIG. 6 is a schematic diagram of an example of a base station according to one or more embodiments of the present invention.
Figure 7:
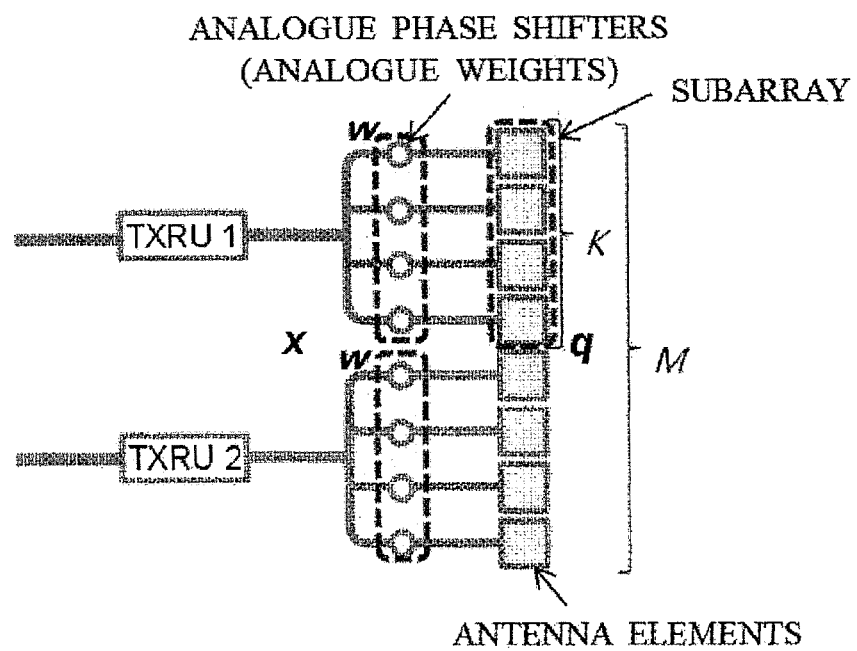
FIG. 7 is a diagram showing applied vertical antenna virtualization (subarray partitioning) according to one or more embodiments of the present invention.
Figure 8:
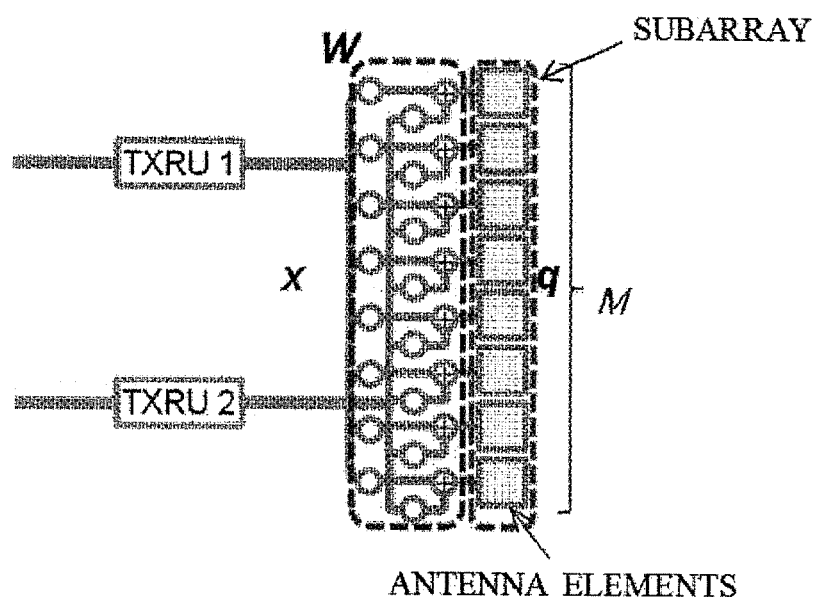
FIG. 8 is a diagram showing applied vertical antenna virtualization (full connection) according to one or more embodiments of the present invention.
Figure 9:
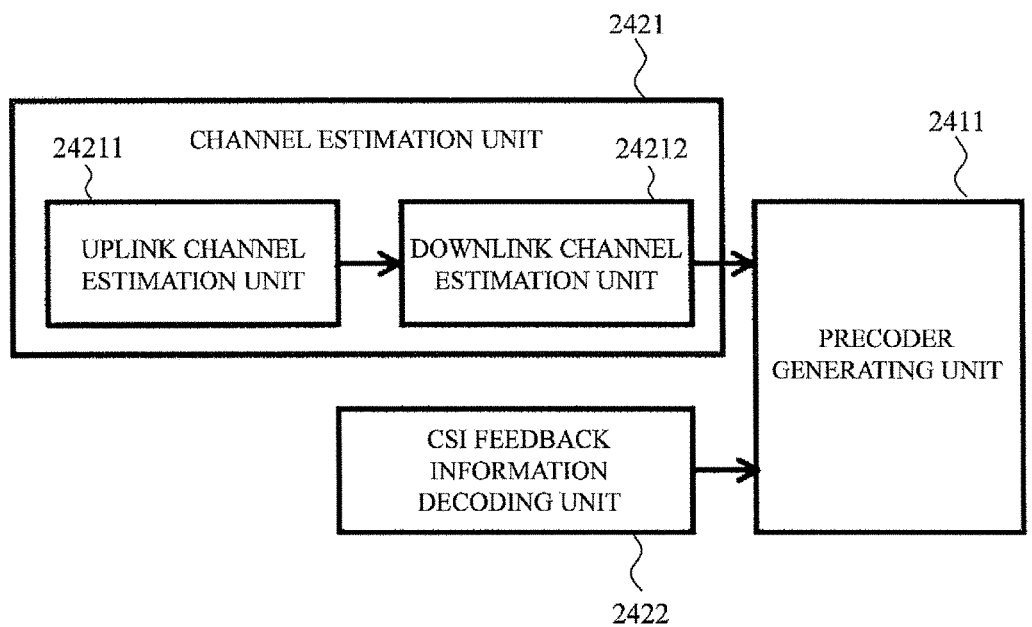
FIG. 9 is a schematic diagram demonstrating signal processing to generate a precoder according to one or more embodiments of the present invention.

The base station 20 according to one or more embodiments of the present invention will be described below with reference to the FIGS. 5 to 9. FIG. 5 shows a functional block diagram of the base station 20 according to one or more embodiments of the present invention. FIG. 6 shows a schematic diagram of an example of the base station 20 according to one or more embodiments of the present invention. FIGS. 7 and 8 show a diagram of vertical antenna virtualization indicating subarray partitioning (SP) and a diagram of vertical antenna virtualization indicating full connection (FC), respectively, according to one or more embodiments of the present invention. FIG. 9 is a schematic diagram demonstrating signal processing to generate a precoder according to one or more embodiments of the present invention.

As shown in FIG. 5, the base station 20 comprises an antenna for a 3D MIMO 21, an RDN (Radio Distribution Network) 22, an RF (Radio Frequency) unit 23, and a base band unit 24. The RF unit 23 includes a transceiver unit (TXRU) 231 and a receiver unit 232. The base band unit 24 includes a transmission signal generating unit 241 and a received signal processing unit 242.

The antenna for the 3D MIMO 21 includes a multi-dimensional antenna having multiple antenna elements such as a two-dimensional antenna (planar antenna) and a three-dimensional antenna such as antennas arranged in a cylindrical shape or antennas arranged on a cube. The antenna for 3D MIMO includes antenna ports having one or more antenna elements. The beam transmitted from each of the antenna ports is controlled to perform 3D MIMO communication with the UE 10.

The antenna for the 3D MIMO 21 easily allows the number of antenna elements to increase compared with linear array antenna. MIMO transmission using a large number of antenna elements is expected to further improve system performance. For example, with the three-dimensional beamforming, high beamforming gain is also expected according to an increase in the number of antennas. Furthermore, MIMO transmission is also advantageous in terms of interference reduction, for example, by null point control of beams, and effects such as interference rejection among users in multi-user MIMO can be expected.

As shown in FIG. 6, the number of planar antenna elements is characterized by the number of vertical elements (M), the number of horizontal elements (N), and the number of polarization elements (P). If the planar antenna is assumed, the number of antenna elements is calculated by the product of M, N, and P. The number of antenna elements of Massive MIMO may be estimated to be from several tens to more than several thousands. Particularly, because frequency is inversely proportional to wavelength, a large number of elements are actually used in frequency bands such as millimeter waves. As another example of an antenna shape, three-dimensional antenna such as multiple antennas arranged in a cylindrical shape or antennas arranged on a cube is used.

Further, mapping of antenna elements and the TXRUs (transceiver units) 231 (virtualization method) greatly affect transmission characteristics in 3D MIMO system. Typical virtualization method called subarray partitioning as shown in FIG. 7 and full connection as show in FIG. 8 will be described below.

(Option 1: *Subarray* partition)

$$q = x \otimes w$$

$$K = M / M_{TXRU}$$

$$w_k = \frac{1}{\sqrt{K}} \exp\left(-j\frac{2\pi}{\lambda}(k-1)d_V \cos\theta_{etilt}\right) \ (k = 1, \ldots, K)$$

-continued (Option 2: Full connection)

$$q = Wx$$

$$w_{m,m'} = \frac{1}{\sqrt{M}} \exp\left(-j\frac{2\pi}{\lambda}(m-1)d_V \cos\theta_{etilt,m'}\right)$$

$$(m = 1, \ldots, M \text{ and } m' = 1, \ldots, M_{TXRU})$$

q is a Tx signal vector at the M co-polarized antenna elements within a column.

x is a TXRU signal vector at $M_{TXRU}$ TXRUs $M_{TXRU}$ is the number of TXRUs per column per polarization dimension.

w and W are wideband TXRU virtualization weight vector and matrix, respectively.

$w_{m,m'}$ is (m,m') element of W.

In subarray partitioning, antenna elements of the base station 20 are grouped by an element group which consists of K elements (sub-array) and a single TXRU is mapped to the antenna elements in a specific sub-array. Adjusting phase rotation amount in each of the antenna elements provides directivity (for example, vertical static tilt). On the other hand, in a process called full connection, an arbitrary TXRU in sub-array is mapped to the antenna elements. Here, an example of vertical virtualization is described, but horizontal virtualization and two-dimensional virtualization (horizontal vertical virtualization) may also be performed.

As shown in FIG. 5, the RF unit 23 generates input signals to the antenna for the 3D MIMO 21 and performs reception processing of output signals from the antenna for the 3D MIMO 21. For example, the RDN 22 that determines connection between the RF unit 23 and the antenna for the 3D MIMO 21 may perform virtualization.

The transceiver unit 231 of the RF unit 23 transmits data signals (for example, reference signals and precoded data signals) via the antenna for the 3D MIMO 21 to the UE 10. The receiver unit 232 of the RF unit 23 receives, from the UE 10, data signals (for example, reference signals and the CSI feedback information) via the antenna for the 3D MIMO 21.

The received signal processing unit 242 of the baseband unit 24 decodes output signals from the RF unit 23. The received signal processing unit 242 includes a channel estimation unit 2421 and CSI feedback information decoding unit 2422.

The channel estimation unit 2421 estimates the uplink and downlink channel states. As shown in FIG. 9, the channel estimation unit 2421 includes an uplink channel estimation unit 24211 and a downlink channel estimation unit 24212.

The uplink channel estimation unit 24211 estimates the uplink channel states based on reference signals for estimating the uplink channel states transmitted by the UE 10. The uplink channel estimation unit 24211 outputs, to the downlink channel estimation unit 24212, the estimated uplink channel states.

The downlink channel estimation unit 24212 estimates the downlink channel states based on the estimated uplink channel states inputted by the uplink channel estimation unit 24211 and the channel reciprocity of uplink and downlink. The downlink channel estimation unit 24212 outputs, to the precoder generating unit 2411, the CSI indicating the estimated downlink channel states.

The CSI feedback information decoding unit 2422 decodes the CSI feedback information transmitted by the UE 10. As shown in FIG. 9, the CSI feedback information decoding unit 2422 outputs the decoded CSI feedback information to the precoder generating unit 2411.

As shown in FIG. 5, the transmission signal generating unit 241 of the baseband unit 24 generates input signals to the RF unit 23. The transmission signal generating unit 241 includes a precoder generating unit 2411 and a reference signal generating unit 2412.

The precoder generating unit 2411 generates (or determines) a precoder applied to the downlink data signals and the downlink reference signals. The precoder is called a precoding vector or more generally a precoding matrix. The precoder generating unit 2411 determines the precoding vector (precoding matrix) of the downlink based on the CSI indicating the estimated downlink channel states inputted by the downlink channel estimation unit 24212 and the decoded CSI feedback information inputted by the CSI feedback information decoding unit 2422.

For example, the precoder generating unit 2411 may determine a vertical precoding vector based on the channel reciprocity and a horizontal precoding vector based on the CSI feedback information. As another example, the precoder generating unit 2411 may determine the rough precoding vector (for example, a broadband precoding vector having a long period, or a precoding vector indicating a rough beam shape) based on the channel reciprocity. The precoder generating unit 2411 may then determine the detailed precoding vector (for example, a narrowband precoding vector having a short period, or a precoding vector having higher directivity) based on the CSI feedback information. By switching the usage of the channel reciprocity and the usage of the CSI feedback information in the two examples above, the precoder generating unit 2411 may obtain the rough CSI based on the CSI feedback information and may obtain the detailed CSI based on the channel reciprocity. For example, channel states may be estimated based on the channel reciprocity as a first step, and then channel states may be estimated based on the CSI feedback information as a second step. In the second step, the channel quality indicator (CQI) obtained in the first step may be used. For example, precoding on the reference signals used in the second step may be performed based on the CSI obtained in the first step. The order of the first step and the second step can be reversed. As another example, three steps may be used to obtain the channel state information based on channel reciprocity, combine the CSI feedback information, and obtain the CSI.

For example, if the base station 20 estimates the channel states using channel reciprocity, the UE 10 is not able to specify the estimated channel states. For example, the base station 20 may notify the UE 10 of CSI indicating the channel states estimated based on the channel reciprocity. For example, downlink control information (DCI) may include the CSI indicating the channel states estimated using the channel reciprocity or channel information obtained based on the CSI feedback information, and the estimated channel state information may be notified by using the DCI. Also, the estimated channel state information may be notified by using an upper layer signaling such as RRC. The notified channel state information may be all or part of RI, PMI and CQI, or other information (for example, BI). As described above, because accuracy of the channel states estimated based on the channel reciprocity greatly depends on accuracy of calibration of the RF unit 23 and the antenna for the 3D MIMO 21, it is anticipated that the channel states estimated based on the channel reciprocity may be rough in some cases. In such a case, the CSI that is notified from the base station 20 may be rough CSI. Here, a codebook in existing LTE Re. 10 8-Tx, Rel. 12 4-Tx is called double codebook, and is indicated as a product of W1, which is broadband PMI having a long period, and W2, which is narrowband PMI having a short period. In the wireless communication system 1 using the double codebook, it may be effective for the base station 20 to notify the UE 10 of W1 selected based on the CSI obtained using the channel reciprocity.

The reference signal generating unit 2412 generates the reference signals for estimating the downlink channel states. Generated signals may be reference signals defined by LTE Rel. 12 such as CSI-RS, dedicated reference signal (DRS) and Cell-specific Reference Signal (CRS), synchronized signals such as Primary synchronization signal (PSS) and Secondary synchronization signal (SSS), and newly defined signals.

Furthermore, the reference signals for estimating the downlink channel states may apply precoding and have directivity. For example, precoding applied to the reference signals may be determined based on the CSI indicating the channel states estimated based on the channel reciprocity, based on the CS1 feedback information, or based on both the CSI indicating the estimated channel states and the CSI feedback information.

The reference signals may be transmitted to a Cell-specific or a UE-specific. For example, the reference signals may be multiplexed on the UE-specific signal such as PDSCH, and the reference signal may be precoded. Here, by notifying a transmission rank of reference signals to the UE 10, estimation for the channel states may be realized at the suitable rank according to the channel states.

(Configuration of User Equipment)

Figure 10:
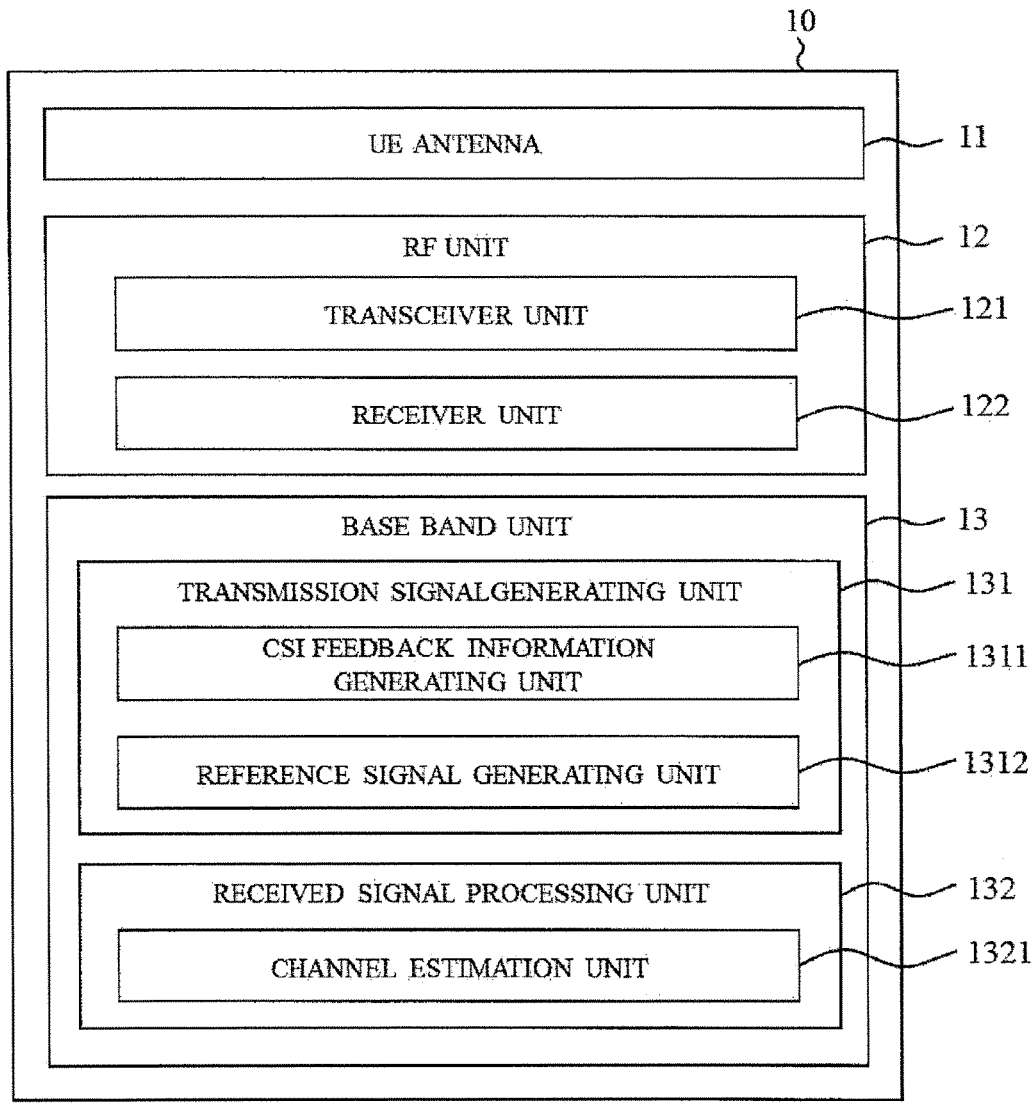
FIG. 10 shows a functional block diagram of a user equipment according to one or more embodiments of the present invention.

The UE 10 according to one or more embodiments of the present invention will be described below with reference to the FIG. 10. FIG. 10 shows a functional block diagram of the UE 10 according to one or more embodiments of the present invention.

As shown in FIG. 10, the UE 10 comprises an UE antenna 11 used for communicating with the base station 20, an RE unit 12, and a base band unit 13. The base band unit 13 includes a transmission signal generating unit 131 and a received signal processing unit 132. The received signal processing unit 132 includes a channel estimation unit 1321 for estimating channel states based on the reference signals transmitted from the antenna for the 3D MIMO 21 on the base station 20.

The transceiver unit 121 of the RF unit 12 transmits data signals (for example, reference signals and the CSI feedback information) via the UE antenna 11 to the base station 20. The receiver unit 122 of the RF unit 12 receives data signals (for example, reference signals) via the UE antenna 11 from the base station 20.

The received signal processing unit 132 includes a channel estimation unit 1321. The channel estimation unit 1321 estimates downlink channel states based on the reference signal transmitted from the base station 20, and then outputs to a CSI feedback information generating unit 1311.

The transmission signal generating unit 131 includes a reference signal generating unit 1312 and the CSI feedback information generating unit 1311.

The CSI feedback information generating unit 1311 generates the CSI feedback information based on the estimated downlink channel states using the reference signals for estimating downlink channel states. The CSI feedback information generating unit 1311 outputs the generated CSI feedback information to the transceiver unit 121, and then the transceiver unit 121 transmits the CSI feedback information to the base station 20. The CSI feedback information may include at least one of Rank Indicator (RI), PMI, CQI, BI and the like.

The reference signal generating unit 1312 generates reference signals for estimating the uplink channel states, and then outputs the generated reference signals to the transceiver unit 121.

(Sequence)

Figure 11:
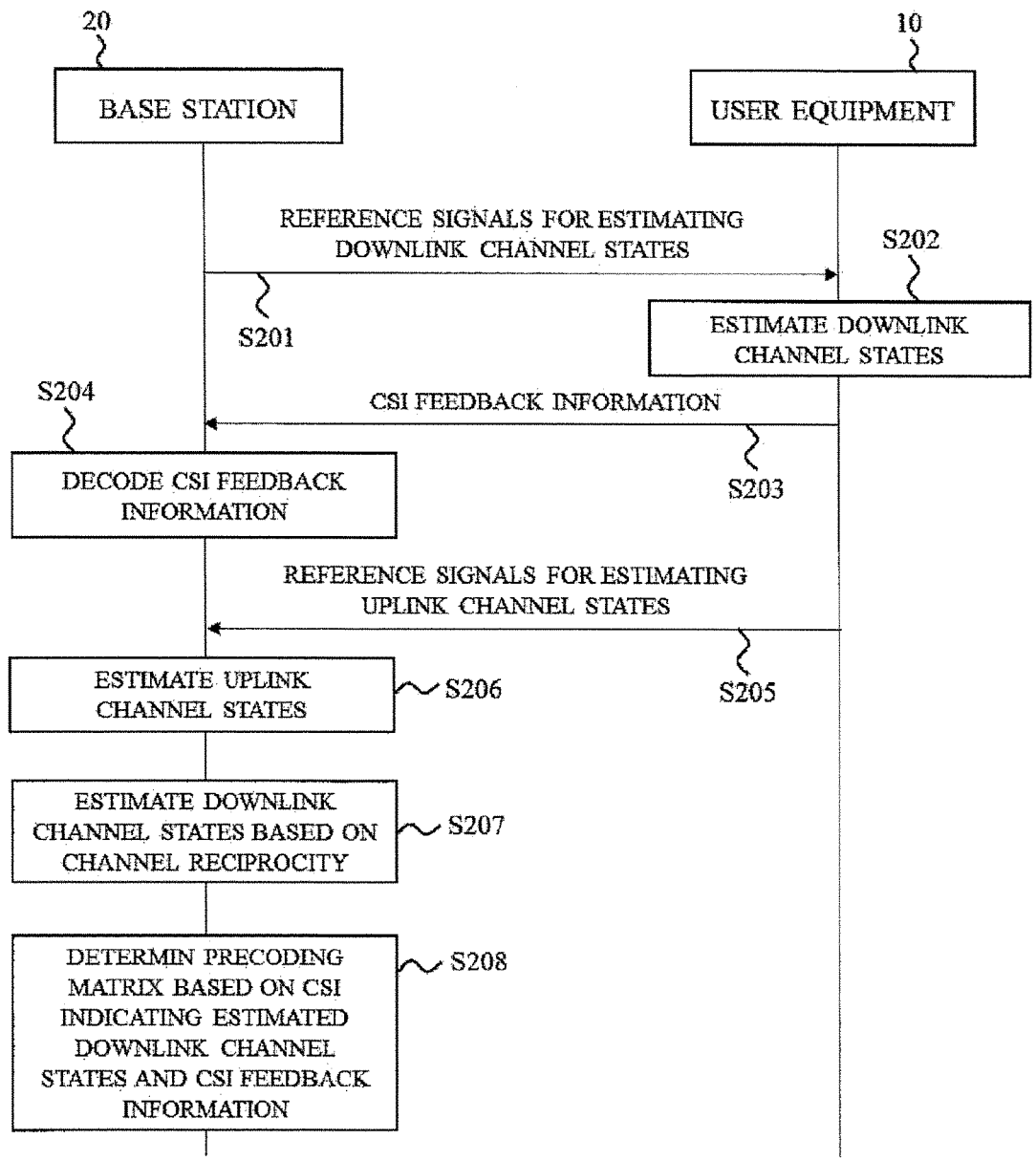
FIG. 11 shows a sequence diagram of a wireless communication system according to one or more embodiments of the present invention.

FIG. 11 shows a sequence diagram of a wireless communication system according to one or more embodiments of the present invention. As shown in FIG. 11, the base station 20 transmits reference signals for estimating downlink channel states to the UE 10 (step S201). The UE 10 estimates downlink channel states between the base station 20 and the UE 10 based on the received reference signals (step S202), and then transmits the CSI feedback information based on the estimated downlink channel states to the base station 20 (step S203). The base station 20 decodes the CSI feedback information from the UE 10 (step S204). The UE 10 transmits reference signals for estimating uplink channel states to the base station 20 (step S205). The base station 20 estimates uplink channel states based on a result of reception of the reference signals for estimating the uplink channel states (step S206), and then estimates downlink channel states based on channel reciprocity of uplink and downlink (step S207). The base station 20 determines the precoding matrix of downlink based on CSI indicating the estimated downlink channel states and CSI feedback information from the UE 10 (step S208). According to one or more embodiments of the present invention, in addition to obtaining CSI using channel reciprocity, link adaptation with high accuracy may be realized by compositely using CSI feedback information from the UE 10.

Another Example

One or more embodiments of another example of the present invention may be applied to beam selection-based precoding. For example, in a system performing beam selection-based precoding using multiple precoded CSI-RS to which different vertical tilt is applied, a vertical tilt angle is determined based on the channel reciprocity in a first step, and then the more detailed CSI is specified in a second step. In this case, because suitable vertical beams are limited in the first step, it is not always necessary to transmit the detailed CSI feedback information corresponding to multiple beams. For example, the base station 20 may instruct the BI and limit the beam for a feedback. In this example, multiple beams (multiple precoded CSI-RSs) transmitted to the vertical different angle has been described, but the multiple beams may be transmitted to the different angle in horizontal and three-dimensional direction according to the directivity of the precoded CSI-RS.

As one or more embodiments of another example of the present invention, there is a method of not sharing the channel state information estimated based on the channel reciprocity. For example, the base station 20 and the UE 10 may independently estimate the channel states. For example, regarding the downlink channel, the UE 10 estimates channel states based on the downlink reference signals from the base station 20. The base station 20 estimates the uplink channel states based on the uplink reference signal from the UE 10, and estimates the downlink channel states using the channel reciprocity. The base station 20 and the UE 10 may independently hold the estimated channel states in an autonomous, distributed manner. For example, if the channel reciprocity with high accuracy is obtained, it may be unnecessary for the base station 20 to notify the CSI. As an example, in the codebook-based feedback, the UE 10 may select W1 and W2, and provide only W2 for feedback to the base station 20 even if the UE 10 does not hold the channel state information notified from the base station 20. As another example, in the system performing beam selection-based precoding, selection of the beam and calculation of the CSI may be performed and only the CSI may be provided for feedback.

As an example, by obtaining the channel state information using a DM-RS which is a reference signal for data signal demodulating, it may be possible for the UE 10 to obtain and feedback the channel state information including precoding gain. The DM-RS used to estimate the channel state information may be reused based on a configuration of the DM-RS for data modulation. As another example, there is a method of using a CSI-RS. The CSI-RS may be precoded according to channel states. For example, by multiplexing the CSI-RS on a UE-specific resource, it is possible to transmit the CSI-RS suitable for a UE. For example, the base station 20 may apply precoding to the UE-specific CSI-RS based on reciprocity information (or the CSI feedback information). In this case, the UE 10 needs the number of rank of the precoded CSI-RS to estimate the precoded CSI-RS. Therefore, the number of rank of the precoded CSI-RS is notified to the UE 10, and the UE 10 can perform CSI feedback based on the number of rank. The number of rank may be notified using the DCI or upper layer signaling. As described above, the base station 20 uses channel reciprocity to estimate the channel state information. However, the base station 20 may use both the CSI feedback information and channel state information obtained using channel reciprocity to estimate the channel state information.

As described above, the base station 20 can specify channel state information with certain accuracy based on channel reciprocity. For example, if the base station 20 can estimate the rough channel state information, the base station 20 may select W from the double codebook defined by LTE Rel. 10, 12 using the channel reciprocity. As an example, the UE 10 may provide detailed information only regarding the PMI (for example, W2 only in the double codebook). If the UE 10 calculates the detailed CSI feedback information, the base station 20 may notify the rough estimated information to the UE 10. As another example, the base station 20 may notify W1 calculated based on the channel reciprocity, and the UE 10 may provide only W2 based on notified W1 for feedback. If the channel reciprocity with high accuracy is realized, only W2 may be provided for feedback without notifying W1.

As another example, there may be a beam selection-based method. For example, the base station 20 may transmit the CSI-RS having a plurality of different directivities, and the UE 10 may select the optimal beam from the CSI-RS. Here, the UE 10 does not need to provide the BI for feedback because using reciprocity with the base station 20 enables selection of the optimal beams. Therefore, the UE 10 may provide the detailed CSI only (for example, all or part of the RI, the PMI, and the CQI). Furthermore, the UE 10 may determine whether the BI is provided for feedback based on signaling indicating whether feedback of the BI is required from the base station 20. The signaling may be upper layer signaling such as the RRC or lower layer signaling such as the DCI.

As described above, in channel estimation based on channel reciprocity, because the UE 10 cannot specify received signal level or reference level, the UE 10 may obtain information on the received signal level or the interference level using the CSI feedback. Specifically, in a system obtaining CSI information using channel reciprocity, only the RI and the CQI or either of them may be provided for feedback. As an example, CSI from channel reciprocity may be used for determination of the precoding vector and the CSI feedback may be used for determination of transmission rank or MCS (Modulation and coding scheme).

CSI feedback information of LTE Rel. 12 consists of a subset of the RI, the PMI, the CQI, and the PTI. As described above, for example, the wireless communication system performing transmission precoding using channel reciprocity adopts a feedback mode that does not include the PMI. To be more specific, aperiodic CSI feedback is defined as feedback mode 2-0 and feedback mode 3-0. Periodic CSI feedback is defined as feedback mode 1-0, and feedback mode 2-0. In the example above, using any one of the four types of feedback modes may be effective.

Here, under LTE Rel. 12, the CQI of the four types of feedback modes above is calculated subject to single antenna transmission (TM 1) or transmission diversity (TM 2). Accordingly, precoding gain in the CQI for feedback is not considered, and an error from an actual link quality may occur in the system performing precoding. Especially, the error may be larger according to an increase in the number of antennas of the base station 20, and effectiveness of the CQI may be lower. Therefore, it is effective to consider precoding gain in case of applying the feedback mode that does not include the PMI.

Figure 12:
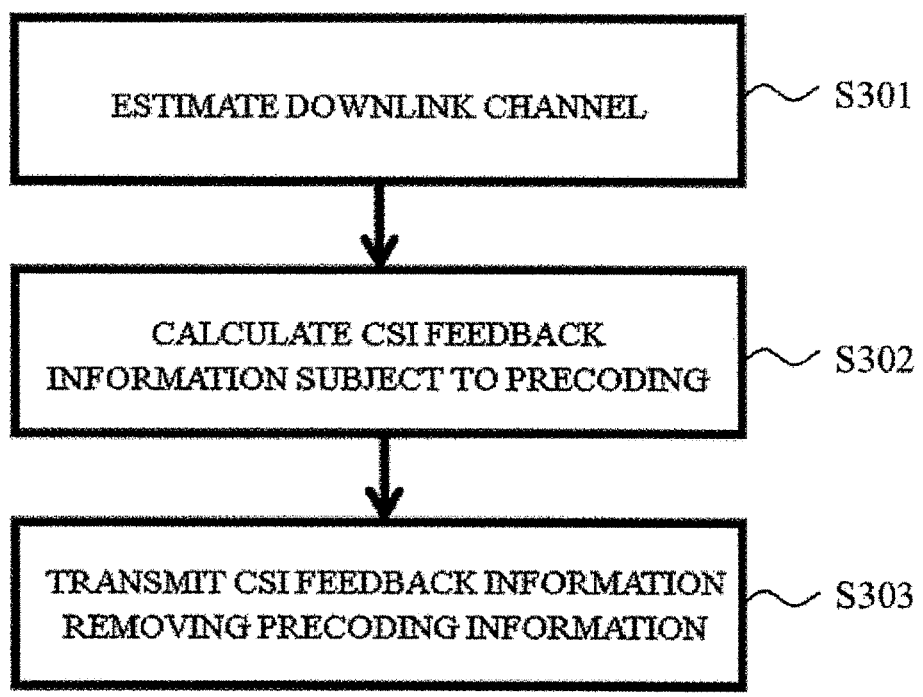
FIG. 12 shows a flowchart of a calculation procedure of CSI feedback information considering a precoding gain according to one or more embodiments of the present invention.

According to one or more embodiments of the present invention, as shown in FIG. 12, in a case where feedback mode that does not include PMI is applied, the UE 10 may: estimate downlink channel states (step S301); calculate the CSI feedback information including, for example, the RI, the PMI, and the CQI subject to the feedback mode that includes the PMI (subject to adaptation of precoding) (step S302); and transmit the CSI feedback information excluding precoding information (the PMI) to the base station 20 (step S303). In this case, the base station 20 may notify the UE 10 of the codebook applied to the UE 10. According to one or more embodiments of the present invention, the precoder may be generated based on certain precoding matrix generation formula, and the CSI subject to the precoder (for example, CQI) may be calculated. For example, the precoding matrix generation formula may be based on the generation formula for eigen-mode transmission (or singular value decomposition based precoding), in which precoder may be determined based on eigenvalue decomposition (EVD) or singular-value decomposition (SVD) of propagation channels, composite channels, or the like. In the example above, the UE 10 may be notified of whether the precoder is considered in calculating the CSI. For example, whether the precoder is considered may be notified to the UE 10 using the upper layer signaling such as RRC or the dynamic signaling such as the DCI. Further, whether premising the precoding is required may be notified using 1 bit information.

One or more embodiments of another example of the present invention may be a method of calculating the CQI based on the currently applied precoding vector. For example, the CQI may be calculated based on a result of estimation of the DM-RS which is a reference signal for data signal demodulating, and the calculated CQI may be provided for feedback. Another example is that the CQI may be calculated based on beamformed CSI-RS.

One or more embodiments of another example of the present invention may be a method for signaling precoder information with the base station 20. For example, the base station 20 may notify the UE 10 of the downlink reference signals and the PMI (and/or the RI) used for calculating the CQI, and the UE 10 may calculate the CQI based on a result of estimation of the reference signals and the signaled PMI (and/or the RI), and provide the calculated CQI for feedback.

As one or more embodiments of another example of the present invention, when channel state information is estimated based on channel reciprocity, feedback mode including the PMI may be applied. In this case, however, the base station 20 may discard all or part of PMI feedback information.

As described above, accuracy of channel reciprocity greatly depends on accuracy of calibration of the transmitter and the receiver. The base station 20 can specify the downlink channel state information based on channel reciprocity. In one or more embodiments, it may be important to specify the accuracy of the downlink channel state information. As an example, accuracy of calibration (or capability) of the UE 10 may be notified to the base station 20. The accuracy of calibration may be defined based on errors of amplitude or phase. Accuracy of each of the amplitude and the phase may be independently notified, or accuracy of a combination of each of the amplitude and the phase may be notified. The accuracy may be categorized based on a plurality of phases (for example, indicating that categories 1-4 exist and the larger the number of category, the higher the accuracy of calibration). The accuracy may indicate whether certain criteria are met (for example, as 1 bit information). Information of the accuracy may be notified for each carrier, for each band, or for each antenna. The information of the accuracy may be notified as a UE capability or as the upper layer signaling such as the RRC.

Embodiments of the present invention have been specifically explained by mainly using the example of downlink MIMO transmission. However, one of ordinary skill would appreciate that the present invention can be applied to uplink transmission as well. For example, it is possible to perform channel estimation using channel reciprocity based on the reference signals obtained by precoding downlink CRS, CSI-RS, DRS, and combinations thereof and synchronized signals such as PSS/SSS.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

EXPLANATION OF REFERENCES

1 Wireless communication system
10 User equipment (UE)
11 UE antenna
12 RF unit
121 Transceiver unit
122 Receiver unit
13 Base band unit
131 Transmission signal generating unit
1311 CSI feedback information generating unit
1312 Reference signal generating unit
132 Received signal processing unit
1321 Channel estimation unit
20 Base station
21 Antenna for 3D MIMO
22 RDN
23 RF unit
231 Transceiver unit (TXRU)
232 Receiver unit
24 Base band unit
241 Transmission signal generating unit
2411 Precoder generating unit
2412 Reference signal generating unit
242 Received signal processing unit
2421 channel estimation unit
24211 Uplink channel estimation unit
24212 Downlink channel estimation unit
2422 CSI feedback information decoding unit

What is claimed is:

1. A base station that communicates with a user equipment using multiple antenna ports, the base station comprising:
   an uplink channel estimation unit that estimates uplink channel states;
   a downlink channel estimation unit that estimates downlink channel states based on the estimated uplink channel states and channel reciprocity of uplink and downlink;
   a receiver unit that receives from the user equipment CSI feedback information; and
   a precoder generating unit that determines a precoding matrix of downlink based on Channel State Information (CSI) indicating the estimated downlink channel states and on the CSI feedback information.

2. The base station according to claim 1, wherein
   the receiver unit receives from the user equipment reference signals for estimating uplink channel states, wherein
   the uplink channel estimation unit estimates the uplink channel states based on the reference signals.

3. The base station according to claim 1, further comprising a transceiver unit that transmits to the user equipment reference signals for estimating downlink channel states, wherein
   the CSI feedback information from the user equipment is generated based on the reference signals.

4. The base station according to claim 3, wherein the reference signals are any one of a Channel State Information Reference Signal (CSI-RS), Dedicated Reference Signal (DRS) and Cell-specific Reference Signal (CRS), Primary synchronization signal (PSS), and Secondary synchronization signal (SSS).

5. The base station according to claim 4, wherein
   the transceiver unit transmits precoded reference signals for estimating downlink channel states based on the precoding matrix, and
   the precoder generating unit determines the precoding matrix based on at least one of the CSI and the CSI feedback information.

6. The base station according to claim 1, wherein the precoder generating unit determines a vertical precoding vector based on the CSI and a horizontal precoding vector based on the CSI feedback information.

7. The base station according to claim 1, wherein the precoder generating unit determines a rough precoding vector based on the CSI and a detailed precoding vector based on the CSI feedback information.

8. The base station according to claim 7, wherein
   the rough precoding vector is a broadband precoding vector having a long period, and
   the detailed precoding vector is a narrowband precoding vector having a short period.

9. The base station according to claim 1, wherein the precoder generating unit determines a rough precoding vector based on the CSI feedback information and a detailed precoding vector based on the CSI.

10. The base station according to claim 1, wherein the base station notifies the CSI to the user equipment by using Downlink Control Information (DCI) or an upper layer signaling.

11. The base station according to claim 6, wherein the notified channel state information is all or part of Rank Indicator (RI), Precoding Matrix Indicator (PMI) and Channel Quality Indicator (CQI), or Beam Index (BI).

12. The base station according to claim 1, wherein the precoder generating unit determines the precoding matrix based on eigenvalue decomposition (EVD) or singular-value decomposition (SVD) using a generation formula for eigenmode transmission.

13. The user equipment according to claim 1, wherein the CSI feedback information includes at least one of Rank Indicator (RI), Precoding Matrix Indicator (PMI), Channel Quality Indicator (CQI), and Beam Index (BI).

14. A user equipment that communicates with a base station, the user equipment comprising:
    a channel estimation unit that estimates downlink channel states based on reference signals for estimating downlink channel states transmitted from multiple antenna ports of the base station;
    a CSI feedback information generating unit that generates CSI feedback information based on the estimated downlink channel states; and
    a transceiver unit that transmits to the base station the CSI feedback information and reference signals for estimating uplink channel states,
    wherein the CSI feedback information includes at least one of Rank Indicator (RI), Precoding Matrix Indicator (PMI), Channel Quality Indicator (CQI), and Beam Index (BI), and wherein
    the CSI feedback information generating unit generates CSI feedback information subject to the feedback mode that includes the PMI, and
    the transceiver unit transmits to the base station the CSI feedback information excluding the PMI.

15. A method for determining a precoding matrix in a three-dimensional (3D) Multiple Input Multiple Output (MIMO) system, the method comprising:
    estimating, with a base station, uplink channel states,
    estimating, with the base station, downlink channel states based on the estimated uplink channel states and channel reciprocity of uplink and downlink;
    transmitting, with a user equipment, CSI feedback information to the base station; and
    determining, with the base station, a precoding matrix of downlink based on CSI indicating the estimated downlink channel states and the CSI feedback information from the user equipment.

16. The method according to claim 15, further comprising:
    transmitting, with the base station, reference signals for estimating downlink channel states to the user equipment;
    estimating, with the user equipment, the downlink channel states based on the reference signals; and
    generating, with the user equipment, the CSI feedback information based on the estimated downlink channel states.

17. The method according to claim 15, further comprising:
    transmitting, with the user equipment, reference signals for estimating uplink channel states to the base station, wherein
    the estimating, with a base station, estimates the uplink channel state based on the reference signals.

* * * * *